J. V. DAWSON.
AUTOMOBILE SHOCK ABSORBER.
APPLICATION FILED APR. 18, 1917.
1,251,348.
Patented Dec. 25, 1917.
2 SHEETS—SHEET 1.
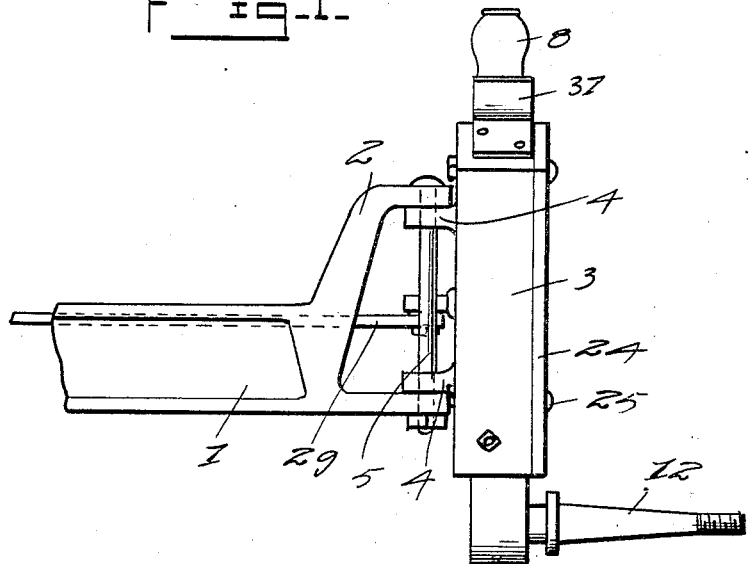
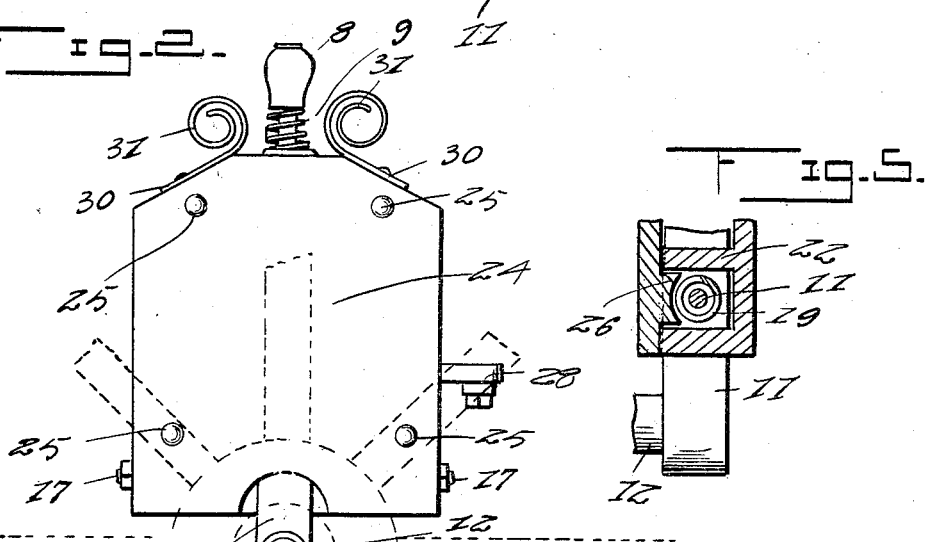
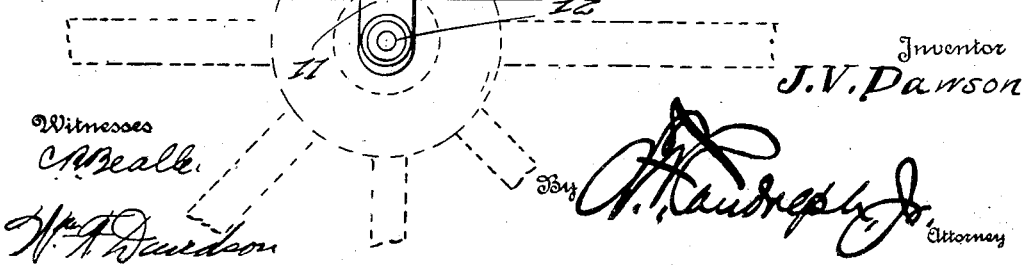
Inventor
J. V. Dawson

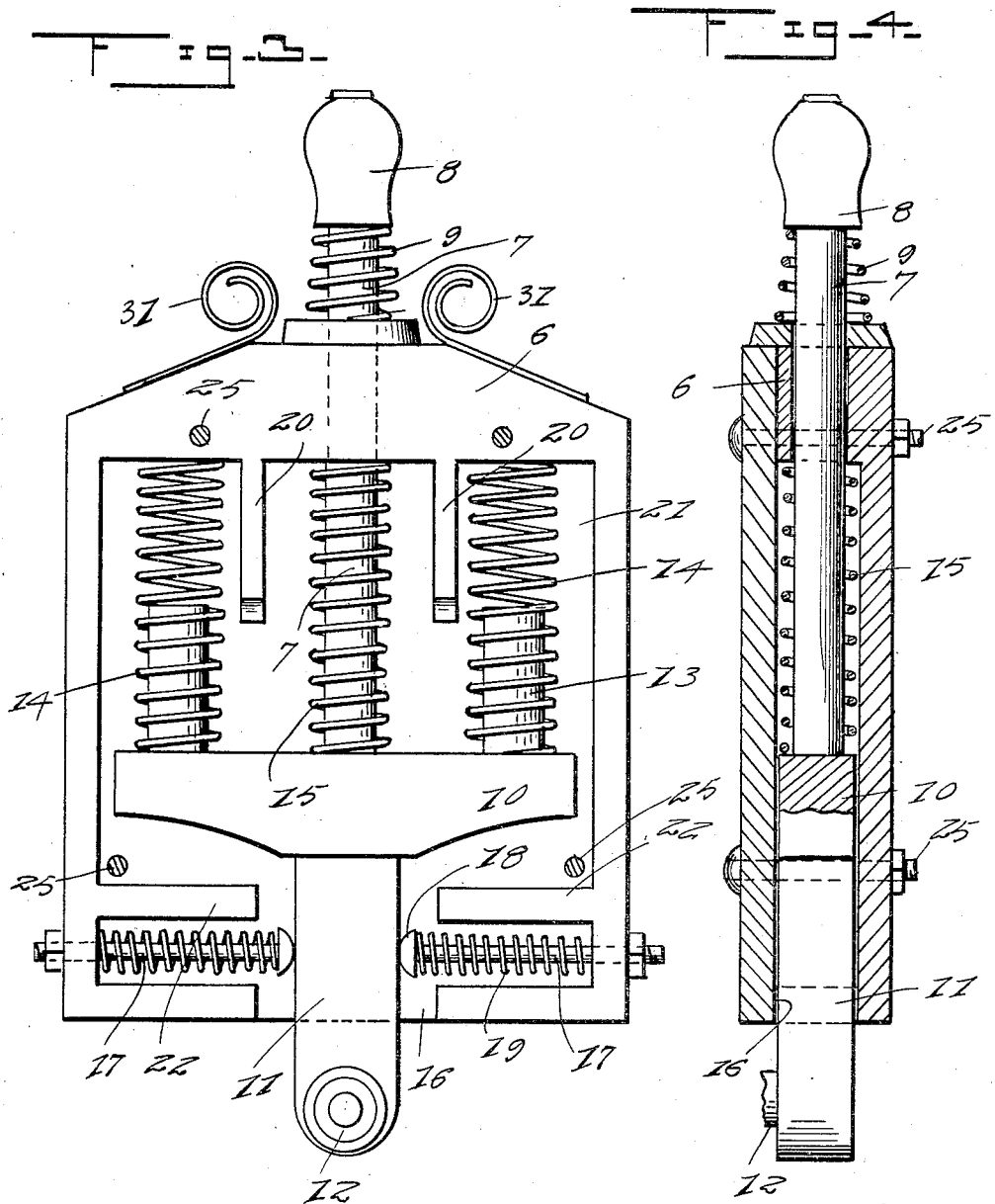

UNITED STATES PATENT OFFICE.

JAMES V. DAWSON, OF DELTA, IOWA, ASSIGNOR OF ONE-THIRD TO JAMES L. MITCHELL, OF WHAT CHEER, IOWA.

AUTOMOBILE SHOCK-ABSORBER.

1,251,348.  Specification of Letters Patent.  Patented Dec. 25, 1917.

Application filed April 18, 1917. Serial No. 162,919.

*To all whom it may concern:*

Be it known that I, JAMES V. DAWSON, a citizen of the United States, residing at Delta, in the county of Keokuk and State of Iowa, have invented certain new and useful Improvements in Automobile Shock-Absorbers; and I do hereby declare the following to be a full, clear, and exact description of the invention, such as will enable others skilled in the art to which it appertains to make and use the same.

This invention relates to improvements in a shock absorber and has for one of its objects, the provision of a device of this character, which can be readily substituted for the steering knuckles of an automobile and which will absorb shocks or jars caused by the wheels passing over uneven ground.

Another object of this invention is to provide casings pivoted to the ends of the front axle of the automobile and having cushioning supporting means therein, on which are journaled, the wheels, whereby shocks and jars received from the wheels caused by them passing over uneven ground will be absorbed.

A further object of this invention is to provide cushioning means for the supporting means, which will absorb lateral movement of the wheels caused when passing uneven ground and which will prevent undue movement of the steering mechanism of the automobile.

A still further object of this invention is the provision of a shock absorber of the above stated character, which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a side elevation of a shock absorber constructed in accordance with my invention, Fig. 2 is a front elevation of the same, Fig. 3 is an enlarged front elevation of the device with the cover of the casing removed, Fig. 4 is a transverse sectional view of the device, Fig. 5 is a detail sectional view illustrating a housing formed in the casing for receiving a cushioning means to absorb lateral movement of the wheels.

Referring in detail to the drawings, the numeral 1 indicates a fragmentary portion of the front axle of an automobile having the usual bifurcated arms 2, to which is usually secured the ordinary steering knuckles. In applying my invention to the front axle of an automobile, the ordinary steering knuckles are removed and my invention substituted therefor. A casing 3 has formed upon the rear wall thereof, a pair of relatively spaced lugs 4, which are apertured to aline with the apertures in the arms 2 for receiving the bolt 5, thus pivotally connecting the casing 3 to the axle 1.

The casing 3 is provided with a head 6, which is provided with a central aperture to slidably receive a rod 7, which extends exteriorly of the casing and has secured to its uppermost end, a head 8, and the head 8 may be secured to the rod 7 in any well known manner so that the same may be readily removed when desired.

A coiled spring 9 surrounds the rod 7 between the head 6 of the casing 3 and the removable head 8. A substantially T-shaped member 10 is formed upon the lower end of the rod 7 and has its leg portion 11 extending through the bottom wall of the casing upon which is formed a spindle 12 of the ordinary construction for rotatably supporting the front wheel of the automobile. Vertically disposed extensions 13 are formed upon the arm portions of the substantially T-shaped member and are surrounded by coiled springs 14, which bear against the head 6 and the T-shaped member 10 as clearly shown in Fig. 3.

A coiled spring 15 surrounds the rod 7 between the substantially T-shaped member 10 and the head 6 of the casing 3. The springs 14 and 15 normally urge the rod 7 and the T-shaped member 10 downwardly within the casing 1, thus when the wheel passes over uneven ground, the rod 7 and the T-shaped member 10 move upwardly within the casing 3 against the tension of the springs 14 and 15, thus absorbing the shock or jar.

When the T-shaped member 10 moves upwardly within the casing, it is returned to its normal position by the springs 14 and 15. The spring 9 limits the downward movement of the rod 7 and the T-shaped member 10.

The opening 16 within the bottom of the casing 3 is of sufficient size to permit lateral movement of the T-shaped member within the casing. Rods 17 are slidably mounted within the side walls of the casing 3 and have heads 18 formed thereon, which engage each side of the leg portion 11 of the substantially T-shaped member 10. A pair of springs 19 surround the rods 17 and bear against the side walls of the casing 3 and the heads 18 for normally urging the heads 18 into engagement with the leg portion 11 of the substantially T-shaped member 10, thus when the wheel passes over uneven ground, and receives a longitudinal force thereby, it is permitted to move laterally against the tension of the springs 19, which will absorb the said movement.

The rods 17 and the springs 19 also prevent any undue movement of the steering mechanism of the automobile caused by lateral movement of the wheels when passing over uneven ground.

Downwardly depending ribs 20 are formed upon the head 6 to form casings 21 to receive the upper ends of the coiled springs 14. Similar ribs 22 are formed upon the side walls of the casings for forming the housing or space 23 for the springs 19 and bolts 17. A cover 24 is removably secured to the casing 3 by bolts 25 and has formed thereon, inwardly directed lugs 26, which are recessed to receive the springs 19 as clearly shown in Fig. 5. Formed upon the casing 3 is a rearwardly extending arm 28 to which the connecting rod 29 of the steering mechanism of the automobile is pivoted, whereby the casing 3 may be swung upon its pivot to turn the front wheel.

Members 30 are secured to the upper faces of the head 6 of the casing and have their free ends coiled as at 31 to form ornaments for the device.

From the foregoing description taken in connection with the accompanying drawings, it will be noted that a novel form of shock absorber has been provided, which can be readily and quickly applied to the front axle of an automobile or substituted for the steering knuckles thereof, and which will absorb all shocks and jars caused by the front wheels passing over uneven ground. It is also to be noted that when the wheels passing over uneven ground are caused to move laterally, this movement will be absorbed, thus preventing undue movement of the steering mechanism of the automobile at such a time.

While I have shown and described the preferred embodiment of my invention, it will be understood that minor changes in construction, combination and arrangement of parts may be made without departing from the spirit and scope of the invention as claimed.

Having thus described my invention, what I claim is:

1. A shock absorber comprising a casing, means for pivoting said casing to an axle of an automobile, a rod slidable in said casing, a T-shaped member formed upon said rod and extending exteriorly of the casing, means for journaling the wheel to said T-shaped member, and cushioning means for absorbing lateral movement of the T-shaped member within said casing, and coiled springs mounted upon the rod and T-shaped member for cushioning the vertical movement of said member.

2. A shock absorber comprising a casing, means for pivoting said casing to the axle of an automobile, a rod slidable in said casing and extending exteriorly thereof, a head secured on said rod, a coiled spring disposed between the casing and the head upon said rod, a T-shaped member formed upon said rod and extending exteriorly of the casing, means for journaling a wheel to said T-shaped member, extensions formed upon the T-shaped member, coiled springs carried by said extensions and bearing against the casing and the T-shaped member, and means for cushioning the lateral movement of said T-shaped member.

3. A shock absorber comprising a casing, means for pivoting said casing to the axle of an automobile, a rod slidable in said casing, a T-shaped member formed on said rod and extending exteriorly of the casing, means for journaling a wheel to said T-shaped member, cushioning means engaging the T-shaped member, rods slidable in said casing, heads formed on said rods and engaging the T-shaped member, coiled springs engaging the casing and heads for urging the heads into engagement with the T-shaped member for absorbing lateral movement of said T-shaped member.

In testimony whereof I affix my signature in presence of two witnesses.

JAMES V. DAWSON.

Witnesses:
W. T. BONSALL,
GEO. A. POFF.